United States Patent [19]

Kleinert

[11] Patent Number: 5,440,834
[45] Date of Patent: Aug. 15, 1995

[54] SINGLE FASTENER PLANT SUPPORT RING FOR USE WITH A T-SHAPED UPRIGHT POST

[76] Inventor: R. Amil Kleinert, 3911 Mt. Lebanon Rd., Charlestown, Ind. 47111

[21] Appl. No.: 314,006

[22] Filed: Sep. 28, 1994

Related U.S. Application Data

[63] Continuation-in-part of Ser. No. 297,628, Aug. 29, 1994, abandoned.

[51] Int. Cl.⁶ .................... A01G 17/06; A01G 17/14
[52] U.S. Cl. ........................ 47/47; 248/217.1
[58] Field of Search ................. 47/475, 39 C; 248/217.1, 125, 315

[56] References Cited

U.S. PATENT DOCUMENTS

| | | |
|---|---|---|
| 726,631 | 4/1903 | Broxey . |
| 730,779 | 6/1903 | Lacy . |
| 753,046 | 2/1904 | Corts . |
| 754,542 | 3/1904 | Chessman . |
| 759,695 | 5/1904 | Gompf . |
| 1,377,832 | 5/1921 | Hanner . |
| 1,922,935 | 8/1933 | DuBois ................. 248/315 |
| 2,851,823 | 9/1958 | Peterson ................. 47/47 S |
| 3,494,072 | 2/1970 | Olson . |
| 3,731,429 | 5/1973 | Orthman ................. 47/475 |
| 3,739,525 | 6/1973 | Rybak . |
| 3,805,340 | 4/1974 | Bush et al. . |
| 4,188,658 | 2/1980 | Aron ................. 248/217.1 |
| 4,232,467 | 11/1980 | Stewart . |
| 4,503,636 | 3/1985 | Stuckey . |
| 4,519,162 | 5/1985 | Stuckey ................. 47/475 |
| 4,534,129 | 8/1985 | Stuckey ................. 47/475 |
| 5,349,775 | 9/1994 | Mondares ................. 248/125 |

FOREIGN PATENT DOCUMENTS

| | | | |
|---|---|---|---|
| 2587586 | 9/1985 | France ................. 47/475 |
| 471298 | 5/1969 | Switzerland ................. 248/217.1 |
| 451906 | 8/1936 | United Kingdom ................. 248/217.1 |
| 714110 | 8/1954 | United Kingdom ................. 47/475 |
| 772297 | 4/1957 | United Kingdom ................. 47/475 |

Primary Examiner—Ramon S. Britts
Assistant Examiner—Joanne C. Downs
Attorney, Agent, or Firm—Camoriano & Smith

[57] ABSTRACT

A structurally strong plant support ring and fastening device usable for supporting plants such as tomato plants and which is adapted to be fastened to a T-shaped support post. The fastener portion of the device has a flange portion adapted to abut a facing flange of the post and an opening adapted to abut one of a plurality of spaced fingers extending out from said facing flange. An arm extending from said flange portion is formed into a hook at the distal end thereof and is adapted to grasp the edge of a post flange extending at a right angle from said facing flange. A ring integral with said flange portion extends out from said flange portion and has a lower supporting brace. In one variation the support ring has a removable arc segment which permits the ring to be easily placed around plants that are ordinarily too tall for placement over the top of the plant.

19 Claims, 5 Drawing Sheets

5,440,834

SINGLE FASTENER PLANT SUPPORT RING FOR USE WITH A T-SHAPED UPRIGHT POST

This application is a continuation-in-part of application Ser. No. 08/297628 filed Aug. 29, 1994, now abandoned. This invention relates to a plant support and, more particularly, to a plant support for use with T-shaped stakes commonly employed for electrical fence wiring.

BACKGROUND OF THE INVENTION

Supports or standards for plants such as tomato plants come in all sizes and shapes. Perhaps the most common support used around residences is the ringed tripod that has wire legs that are pushed into the ground and a plurality of spaced wire rings, usually three, that become progressively smaller from the ground upward. Several older patents depict adjustable plant supports such as those illustrated in U.S. Pat. Nos. 730,779 to Lacy, 753,046 to Corts, and 754,542 to Chessman. U.S. Pat. No. 1,377,832 to Hanner describes a plant support in which a V-shaped stake provides a support for a wire ring at spaced positions along the intersection of the two sides of the stake. The ring in the Hanner patent is capable of sliding on the stake between the spaced positions and being secured at the positions by engagement of a bent portion of the ring with apertures in the stake. In one embodiment, the diameter of the ring can be enlarged through disengagement of the otherwise hooked ends of the ring, allowing the ring to expand and accommodate large plants.

U.S. Pat. No. 3,731,429 issued May 8, 1973 to Orthman describes a plurality of concentric rings that are fixed to a support that is removably secured to a post having a T-shaped cross section. The primary means for support is the registry of openings in the bracket with spaced shoulders on the post. There appears to be no positive fastening of the device to the center post.

While the prior art addresses the needs of growers of small quantities of plants such as typically done at residences, those growers who desire to have a larger number of plants find the available plant supports unwieldy and often structurally too weak for use more than one growing season. The frequent removal and insertion into the ground often distorts the legs, making the entire support unusable. It would be particularly advantageous if plant supports were available that were compatible to the extremely common existing stakes or posts used for fencing, particularly electrical fencing. Such posts are T-shaped in section and have ribs at spaced intervals for ensuring the electrical insulator fasteners attached to the posts are properly spaced. Because the T-shaped posts are rugged in construction, have excellent weathering characteristics, and are commonly available, use of T-shaped posts as plant support standards would be highly beneficial.

It is therefore an object of the present invention to provide for a plant support compatible with the structure of a T-shaped post.

It is still another object of the present invention to provide for a plant support compatible with the structure of a T-shaped post that is easily fastened to and removed from the post.

It is yet another object of the present invention to provide for a plant support compatible with the structure of a T-shaped post that is easily adjustable up and down the post between fixed positions.

It is a further object of the present invention to provide for a plant support compatible with the structure of a T-shaped post that is light weight and easily fabricated.

It is still a further object of the present invention to provide for a plant support usable with various types of plants such as tomato plants and which is compatible with the structure of a T-shaped post with a removable arc segment of the ring allowing plants to be moved into the interior of the ring and the removed arc portion replaced thereby encircling and affording support to tall plants or plants having crown or base portions larger than the diameter of the ring.

SUMMARY OF THE PRESENT INVENTION

The present invention contemplates a plant support ring and fastening device for use with an upright support having a T-shaped cross section. The T-shape is formed by a first flat flange having a predetermined width along a first side thereof and a second flat flange integral and perpendicular to the first flange along a line extending longitudinally down the center of an opposite side of said first flat flange. In a accordance to the present invention, a support ring, integral to a support member, is adapted to be secured to a T-shaped post. The support member comprises a downwardly extending flange member abutting the first surface of the first flange of the post. The support member further has an arm that extends outwardly from the downwardly extending flange and has a terminal end portion formed into a hook grasping the free end of the second flange. At least one side of the downwardly extending flange member is inwardly turned forming a hook that grasps the associated side of has a hoof the second leg is adapted to hook around a free edge of the second flange. The fastener body has sufficient resiliency to permit the legs to open for insertion upon and removal from said T-shaped support. A support ring is secured to the first leg and adapted to extend horizontally outward therefrom when the fastener is attached to the T-shaped support. In a preferred embodiment, the ring is provided with an underlying support brace to reduce horizontal movement of the ring relative to the T-shaped post when in use.

DETAILED DESCRIPTION OF THE INVENTION

Figure 1:
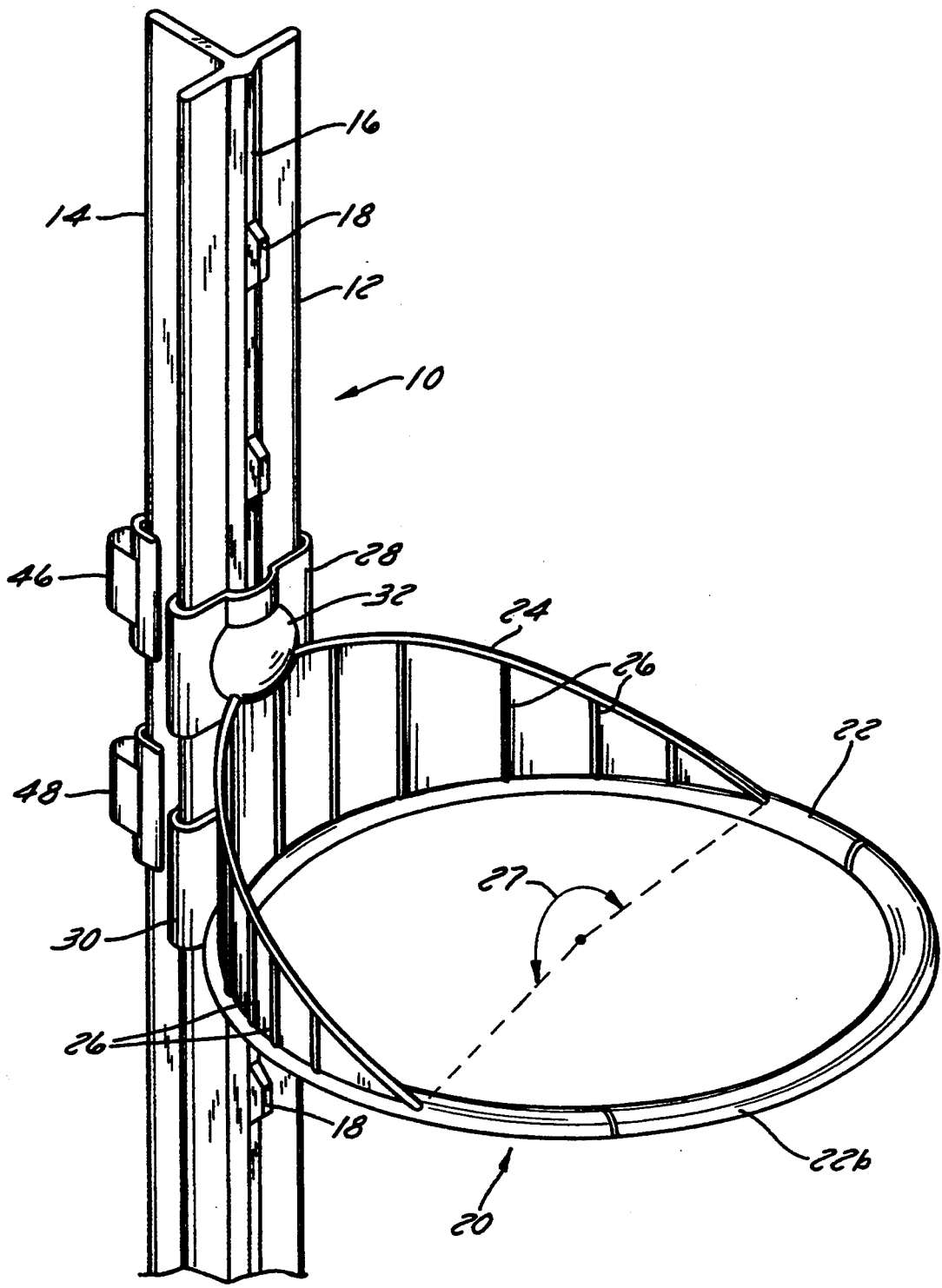
FIG. 1 is a perspective view of a plant support ring and fastener in accordance with one embodiment of the present invention secured to a T-shaped post.

Referring to FIG. 1, it may be seen that an upright post 10 has a T-shaped cross-section and is formed from a pair of flanges 12 and 14 with flange 14 secured along the longitudinal axis of flange 12 along one side thereof thus forming the stem of the "T". The opposite surface of the flange 12 may be provided with a ridge 16 having a plurality of spaced shoulders 18. As stated previously, posts of the shape of post 10 are commonly used to support insulating fasteners connected to electric wiring with the shoulders 18 acting as spacers and abutments for the insulating fasteners.

Figure 2:
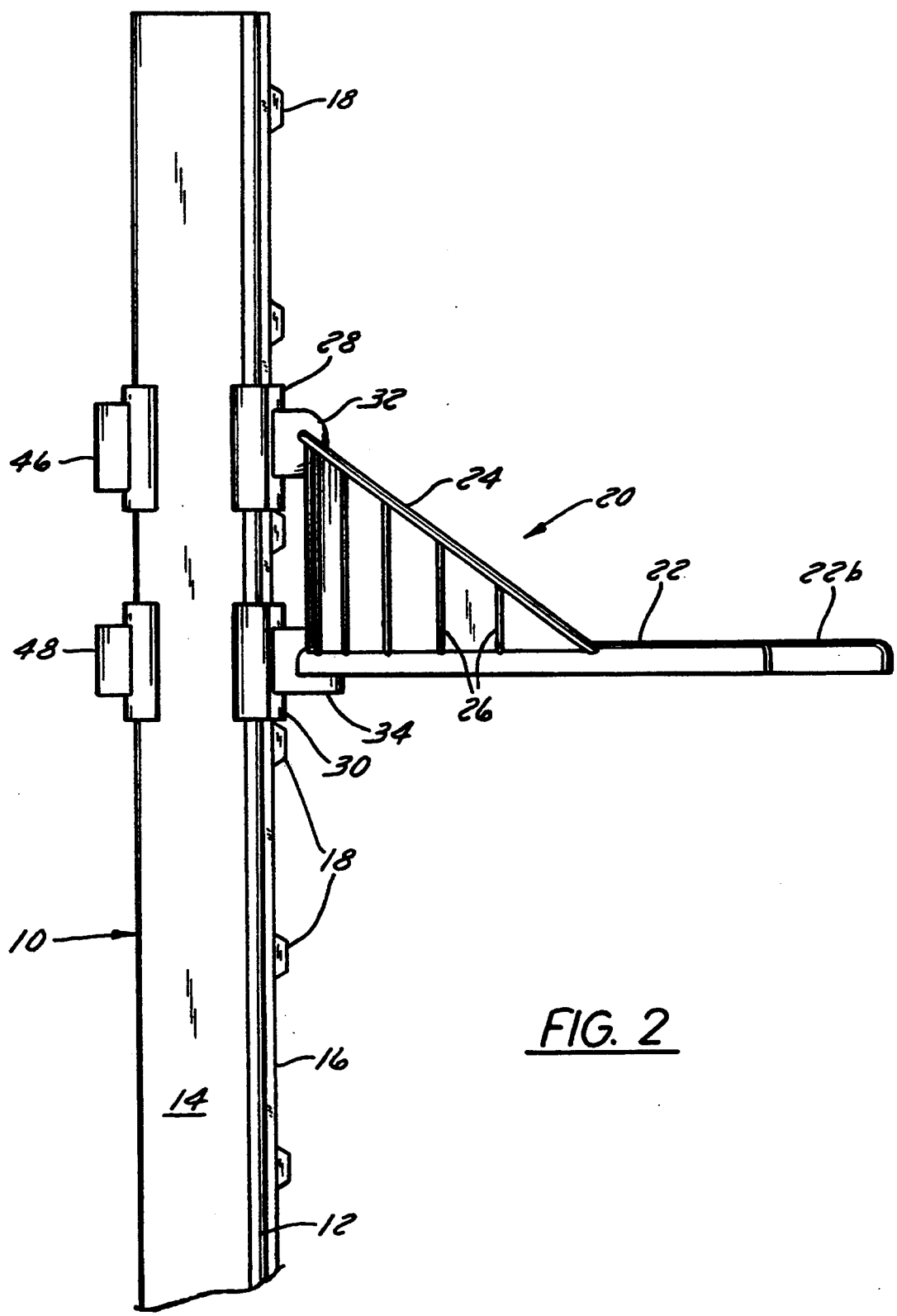
FIG. 2 is a side elevation view of the plant support ring and fastener of FIG. 1.
Figure 5:
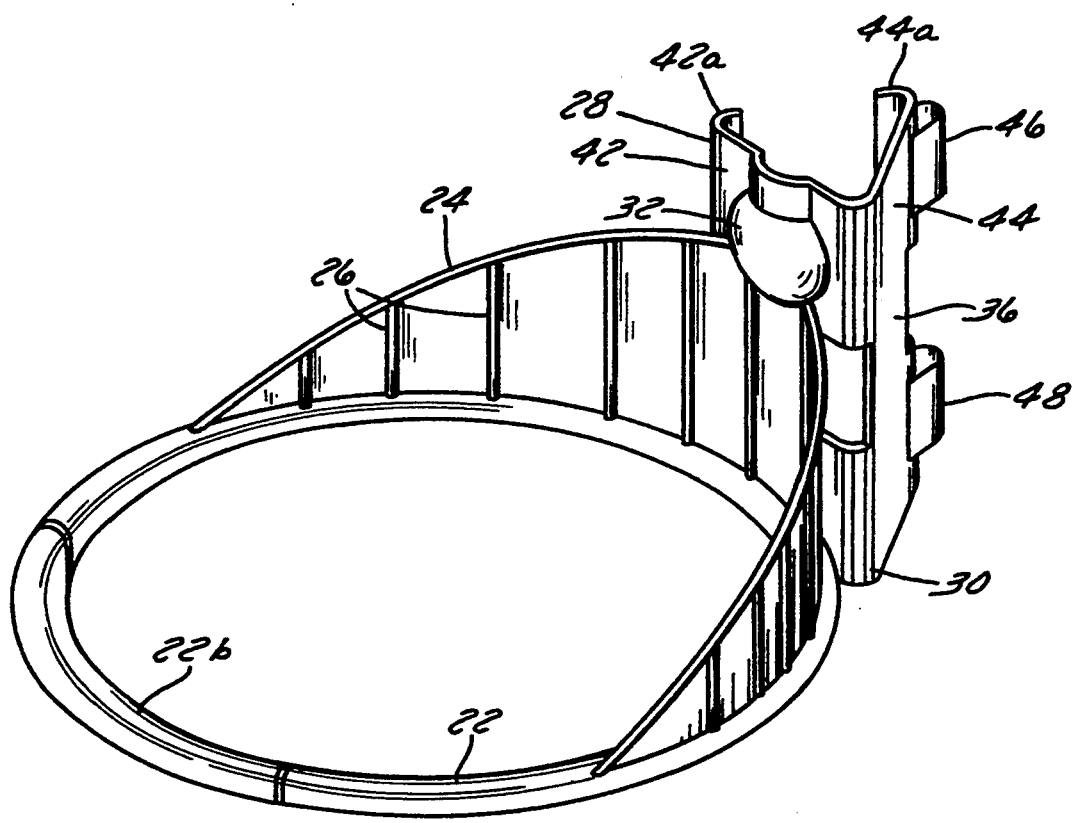
FIG. 5 is a perspective view of an alternate construction of a plant support ring having a removable arc portion in accordance with the present invention.

In accordance with one embodiment of the invention, a plant support shown generally by character numeral 20 is removably mounted on post 10. Support 20 is comprised of three major components, namely, a ring 22, a brace member 24, and a single piece fastener mounted on post 10 comprising a pair of post clips 28 and 30 spaced a predetermined distance apart. Ring 22 is preferably between about eight to fourteen inches in diameter. Brace 24 is a hood shaped member circular in section and is secured at its lower end to ring 22. Brace 24 extends along the upper surface of ring 22, preferably in an arc greater than about 180 degrees as shown by angle 27, and has a plurality of reinforcing ribs 26. As perhaps best illustrated in FIG. 2, a pair of clip extensions 32 and 34 respectively extend outwardly from clips 28 and 30 and are secured respectively to the upper central part of brace 24 and to ring 22. Spaced clips 28 and 30 are integrally connected by member 36 as best seen in FIG. 5. Referring to FIG. 2, it may be seen that the predetermined spacing distance between clips 28 and 30 is the distance between spaced shoulders 18, allowing the bottom part of each clip 28 and 30 to abut a finger 18 to prevent downward slippage of fastener 27 and, therefore, support 20 along post 10.

Figure 3:
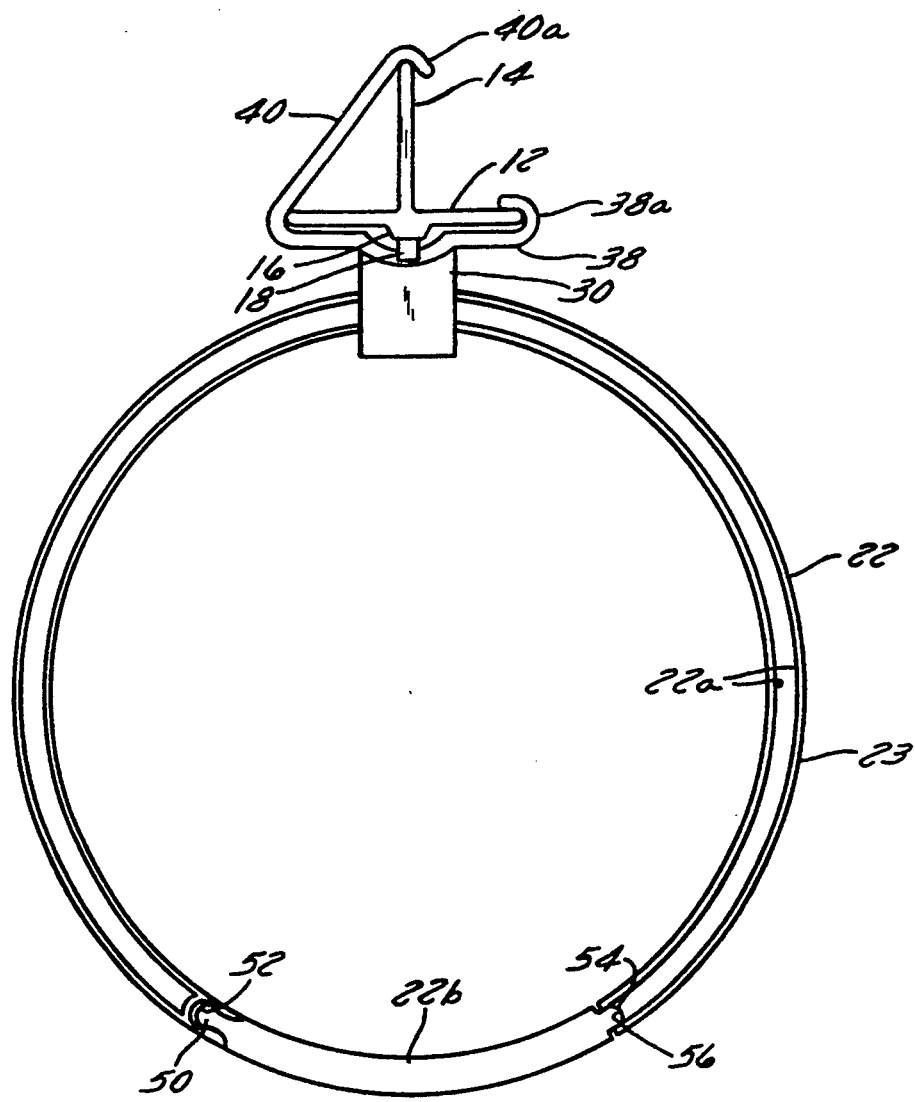
FIG. 3 is a bottom view of the plant support ring and fastener of FIG. 1.

From FIG. 3 it may be seen that the clip 30 and therefore the fastener itself has a V-shaped cross section. Clip 30 is shown with a leg 38 that extends across the width of flange 12 with a distal end thereof formed into hook 38a adapted to hook around and abut one edge of flange 12. A leg 40 integral with the other end of leg 38 is formed at an angle thereto and has a distal end thereof formed into a hook 40a adapted to hook around and abut the free edge of flange 14. Similarly, clip 28 has legs 42 and 44 with respective hooks 42a and 44a that cooperate identically with post 10 and function identically to hook around and abut the edges of flanges 12 and 14. Legs 40 and 44 are each provided with a respective tabs 46 and 48. It is preferred that the entire support preferably be made from a tough material such as PVC that is weather resistance and can stand repeated flexing. The structure of the single piece fastener with its spaced and independently flexing clips provides sufficient resiliency to be bent back by the manually pulling of tabs 46 and 48 thereby permitting easy insertion or removal of the single piece fastener from its position on post 10. Moreover, the easy removal of the single piece fastener allows easy adjustment of the fastener up and down the post as desired.

As shown in FIG. 3, it is preferred that ring 22 be a semicircular in section and having a pair of inwardly turned lips 22a. This type of structure is more suitable for the molding process in fabrication and provides for increased resistance against bending of the ring under the weight of plants when in use.

In some situations it is desirable to provide support for an existing plant or tree. Due to the height and circumference of the tree, it may be difficult to place the ring of the present invention about the tree. To accommodate such situations, ring 22, as shown in FIGS. 1, 3 and 5, may be provided with a removable arc segment 22a that can occupy as much as one third of the circumference of ring 22. The ring portion is provided with end elements that compliment end elements of the remaining ring portion 22 to allow the arc segment to be easily snapped into and out of place. By removing the arc segment, the remaining portion of the ring can easily be placed about the tree through the opening and the arc portion then snapped back into place.

Figure 6A:
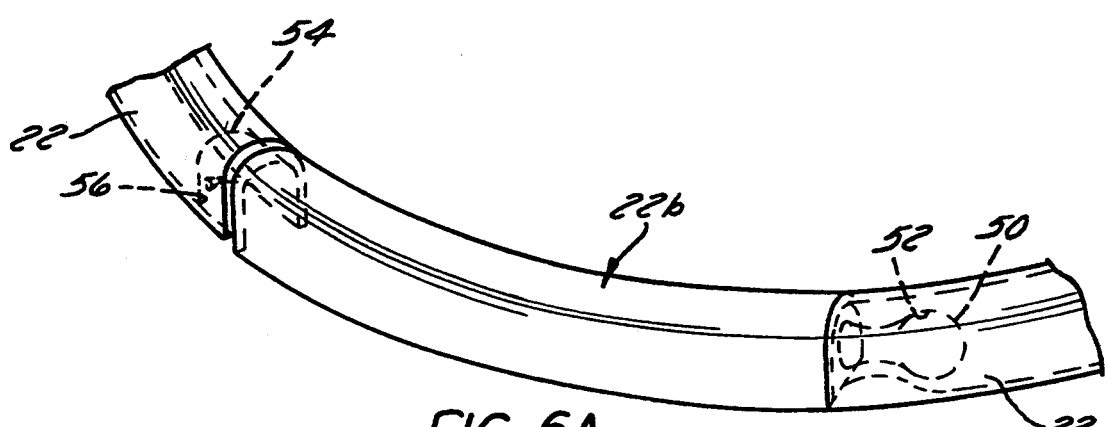
FIG. 6A is a view of a portion of the ring in FIG. 5 showing in dashed lines the structure permitting the removal and reinsertion of an arc portion of the ring.
Figure 6B:
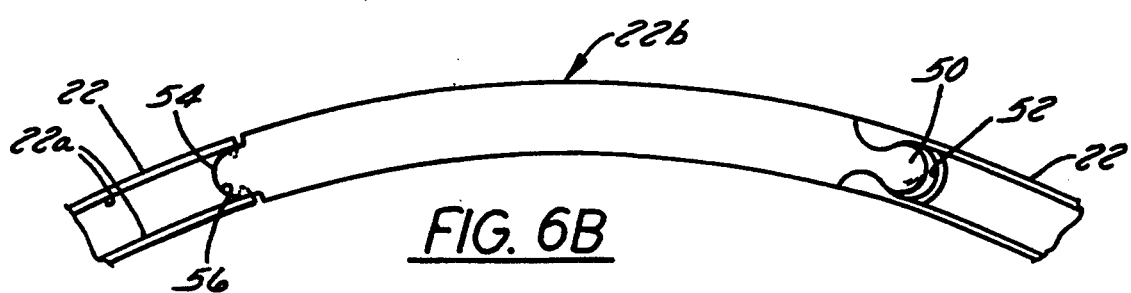
FIG. 6B is a bottom sectional view of the fastener structure elements of the rings illustrated in FIG. 6.

FIGS. 6A and 6B show the end elements of the arc segment 22a complimentary to the end elements of the remaining portion of the ring that permit the snapping in and out of place of arc segment 22a. Segment 22a may be provided at one distal end thereof with a ball portion 50 that snap fits within a socket 52 of ring 22. The other end of segment 22a may be conveniently provided with a sliding element 54 that snap fits within a slot 56 of ring 22. When element 54 is snapped out of engagement with slot 56, segment 22a can swing freely as socket 52 pivots in socket 52, permitting ring 22 to be fitted about a tree without complete disengagement of segment 22a. This allows the user to slide ring 22 about the tree through the opening therein and in one easy motion snap fit the loose or free end of segment 22a in place to close the opening.

Figure 4:
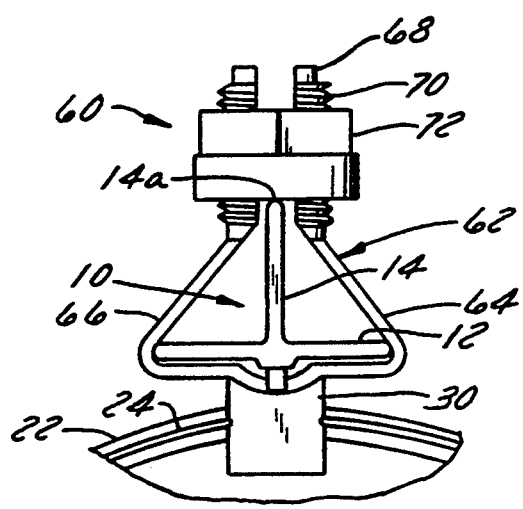
FIG. 4 is a top view of an alternate construction of a fastening device usable with a plant support ring and T-shaped post in accordance with the present invention.

FIG. 4 illustrates a fastener of an alternate type of construction and comprises an element 62 abutting one side of flange 12. A pair of arms 64, 66 is shown to be integral with and extending from the ends of element 62 and terminate in a split cylinder 68 provided with exterior threading 70. A threaded nut 72 is positioned on split cylinder 68 and threaded against the free edge 14a of flange 14. Tightening nut 72 against free edge 14a serves to maintain fastener 60 against post 10.

Figure 7:
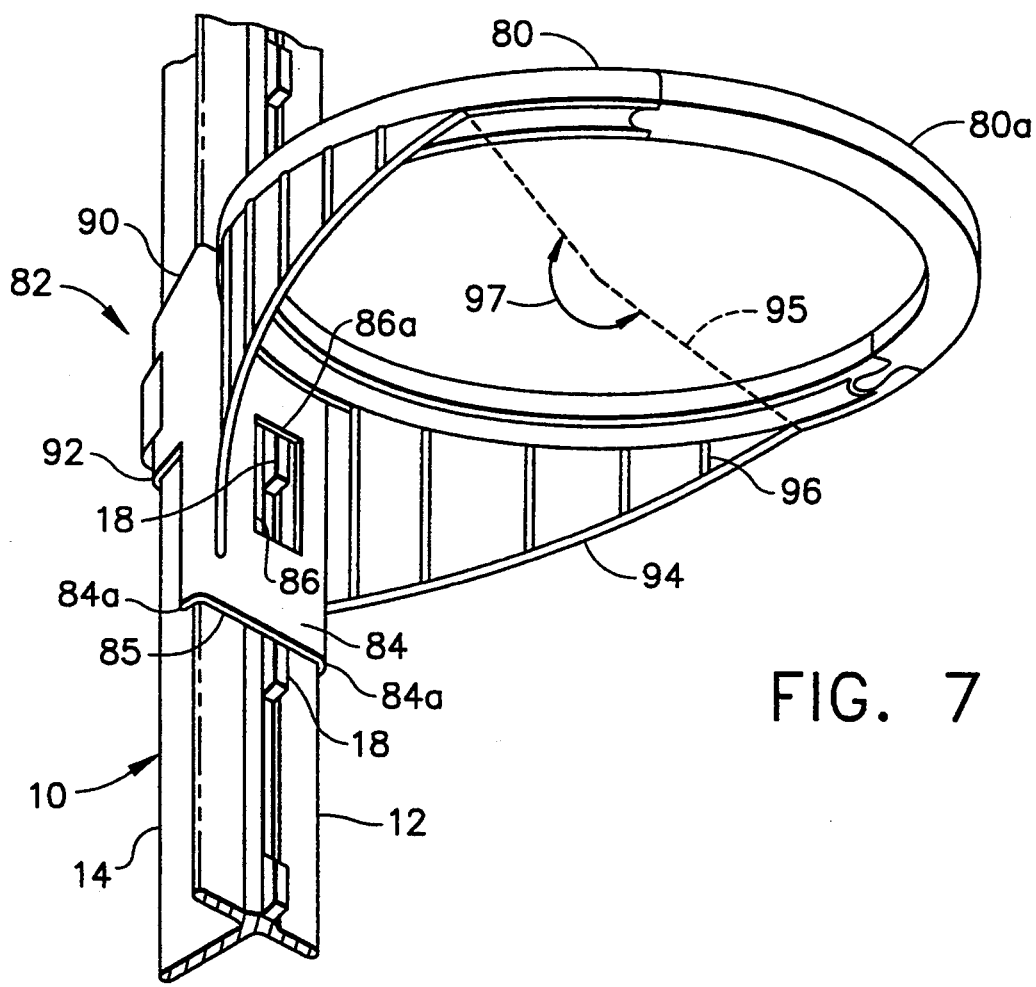
FIG. 7 is a perspective view of a preferred embodiment of the present invention in which a support member underlies the support ring.
Figure 8:
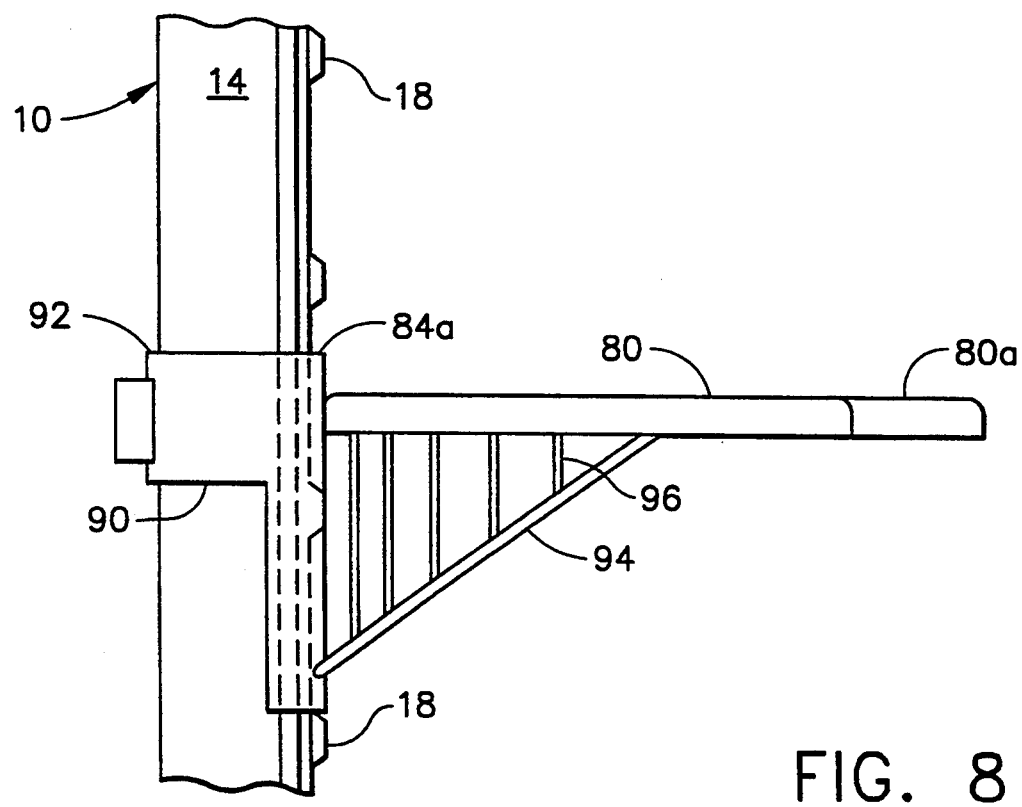
FIG. 8 is a side elevation view of the embodiment of FIG. 7.

Referring now to FIGS. 7 and 8 representing still another alternate and preferred construction of the present invention, it may be seen that a support ring 80 is supported by the top of a fastener 82 having a flange portion 84 extending downwardly and adapted to abut against flange 12 of upright post 10. Flange portion 84 has an opening 86 that permits a selected one of the spaced shoulders 18 to project therethrough and abut the top edge 86a of opening 86. The length of flange portion 84 is selected such that the bottom edge 85 thereof abuts the next spaced finger 18. This prevents fastener 82 from sliding downwardly relative to upright post 10.

An arm 90 extends at an angle from one side of flange portion 84 and the distal end of arm 90 is formed into a hook 92 adapted to resiliently grasp the free edge of flange 14 of post 10 and positively secure the fastener 82 to post 10. In this construction, the side 84a of the flange portion 84 on the same side as arm 90 is turned at a right angle while the opposite side 84b is turned inwardly, forming a hook in section to enclose and abut the associated edge of flange 12. This structure facilitates placement of the fastener 92 on upright post 10, provides increased positive attachment thereto, and permits up-and-down adjustment along post 10 when desired. Tab 93 connected to arm 90 permits fastener 82 to be easily removed from post 10 by grasping it with one hand and post 10 with the other hand, flexing arm 90 and hook 92 away from post 10 thereby removing fastener 82 altogether.

Like in the constructions of FIGS. 1-6, a brace 94 in the form of hood shaped member circular in section extends is secured to ring 80. However, in this construction brace 94 underlies ring 80, extending outwardly from flange portion 84 and is integral with the underside of a portion of the circumference of support ring 80. Brace 94 extends along the circumference of ring 80 to points spaced at least 180° apart as indicated by the angle 97 formed by dashed lines 95. Vertically oriented ribs 96 reinforce brace 94 against downwardly acting forces caused by the weight of plants extending through the ring opening and thus assists in resisting undesired cantilevering and deformation of fastener 82 under such weight. Additionally, because brace 94 is beneath the ring and does not interfere with plant limbs extending outwardly over ring 80, the entire circumference of the ring is available for support purposes. Moreover, only a single clip fastener 82 is necessary to positively secure ring 80 and flange support portion 84 to the post 10. The construction in FIG. 7 and 8 may also use the horseshoe type ring material as set forth in the embodiment of FIGS. 1-3 and an arc section 80a that may be opened as described in FIGS. 3 and 6A, 6B.

From the above it may be seen that the plant support device of the present invention provides for a structurally strong plant support and is positively secured to the T-shaped post. Moreover, it is easily adjustable and removable from the post. As desired, the ring can be fabricated so that a portion of the arc thereof is removable to allow the ring to be easily replaced around plants with large crowns.

It should be understood that other modifications and variations of the invention will become readily apparent upon a reading of the specification. For example, it is clear that more than one ring may be employed to provide the adjustable support as needed. Further, the fastener illustrated in FIG. 4 may be used with the ring structure of FIGS. 7 and 8. Such modifications and variations should be considered to fall within the spirit and scope of the claims as hereafter set forth.

I claim:

1. A plant support ring and fastening device for use with an upright support having a T-shaped cross section formed by a first flange having a predetermined width along a first side thereof and a second flange integral and perpendicular to said first flange, said device comprising
   (a) a fastener device including
      (i) a flange portion positioned in an abutting relationship with said first flange and
      (ii) an arm extending from a first side of said flange portion and having a distal end thereof formed into a hook adapted to hook around and be positively engaged to a free edge of said second flange, said flange portion having at least a part of the side opposite to said first side formed into a channel adapted to hook around and enclose an associated edge of said first flange,
   (b) at least one ring secured to said flange portion and adapted to extend horizontally outward therefrom when said fastener device is attached to said support upright; and
   (c) a ring support positioned beneath said ring and extending from said flange portion to and supporting said ring along at least a part of the circumference thereof.

2. The device of claim 1 in which said first flange has a plurality of spaced shoulders projecting therefrom and said flange portion defines an opening having a top edge which abuts one of said shoulders while a bottom edge of said flange portion abuts a second of said spaced shoulders thereby preventing said fastener device from sliding downwardly relative to said upright support.

3. The device of claim 1 in which said ring support is a solid shell member continuously attached to said ring along the bottom surface thereof and extending to at least said two positions along the circumference of said ring spaced no less than about 90° apart.

4. The device of claim 3 in which said solid shell member is provided with a multiplicity of spaced reinforcing ribs running vertically along said solid shell member.

5. The device of claim 1 in which said ring has a horse shoe shaped cross-section.

6. The device of claim 1 in which said ring has a removable arc segment.

7. The device of claim 6 in which said ring has a pair of end members adapted to be releasably secured to respective distal ends of said removable arc segment, said distal ends of said removable arc segment having respective first and second securing elements, said first securing element when secured to said ring allowing said removable arc segment to pivot about said respective end of said ring when said second securing element is not secured to its said respective end of said ring.

8. The device of claim 1 in which said flange portion extends downwardly from said arm and has at least one inwardly turned side forming a hook for grasping an associated edge of said first flange.

9. The device of claim 8 in which said inwardly turned side is formed on the side of said flange portion opposite to said arm.

10. In combination, an upright support member adapted to be secured into the ground in a substantially vertical position and a plant support device,
   said support member defined by a first flange having a predetermined width along a first side thereof and a second flange integral and perpendicular to said first flange, said second flange forming a free end, and
   said plant support device comprising a ring for supporting plants, a ring fastener integral to said ring at a position along the circumference thereof for securing said ring to said support member in a substantially horizontal position, and a ring support structure integral to said ring fastener for minimizing displacement of said ring from said horizontal position,
   said ring fastener having
      a planar portion that abuts a major surface of said first flange, is integral with said ring at a position along the circumference thereof, and maintains said ring in said substantially horizontal position when abutting said major surface of said first flange, and
      a resilient arm extending from one side of said planar portion with a distal end terminating in a hook, said hook releasably engaging the free edge of said second flange, said planar portion having a side opposite said one side formed into a channel to enclose an adjacent edge of said first flange; and said ring support structure extending out from said ring fastener to support said ring at positions along the circumference thereof at least 90 degrees from said position on said circumference.

11. The combination of claim 10 in which said upright support member has a plurality of spaced shoulders and said planar portion defines an opening through which one of said spaced shoulders extends, said one shoulder abutting said planar portion along a top side of said opening and a second shoulder abutting said planar portion along the lower edge thereof thereby minimizing vertical displacement of said device relative to said upright support member.

12. A plant support ring and fastening device for use with an upright support having a T-shaped cross section formed by a first flange having a predetermined width along a first side thereof and a second flange integral and perpendicular to said first flange, said device comprising (a) a fastener having a V-shaped cross section including
   a first leg extending the width of said first side of said first flange with a distal end thereof formed into a first hook adapted to hook around one edge of said first flange and
   a second leg formed at an angle to said first leg at the other end of said first leg, said second leg having a distal end thereof formed into a second hook and adapted to hook around a free edge of said second flange, said fastener having sufficient resiliency to open the legs for insertion upon and removal from said upright support, and (b) at least one ring secured to said first leg and adapted to extend horizontally outward therefrom when said fastener is attached to said upright support.

13. The device of claim 12 including a ring support secured to said fastener that extends to and supports said ring at least two positions along the circumference of said ring at least 90 degrees displaced from a point at which said ring is secured to said first leg.

14. The device of claim 13 in which said ring support is a solid shell member continuously attached to said ring along the top surface thereof and extending to at least said two positions.

15. The device of claim 14 in which said shell member is provided with a multiplicity of spaced reinforcing ribs running vertically along said shell member.

16. The device of claim 12 in which said ring has a removable arc segment.

17. The device of claim 16 in which said ring has a pair of end members adapted to be releasably secured to respective distal ends of said removable arc segment, said distal ends of said removable arc segment having respective first and second securing elements, said first securing element when secured to said ring allowing said removable arc segment to pivot about said respective end of said ring when said second securing element is not secured to its said respective end of said ring.

18. In combination, an upright support member adapted to be secured into the ground in a substantially vertical position and a plant support device, said support member defined by a first flange having a predetermined width along a first side thereof and a second flat flange integral and perpendicular to said first flange, said second flange forming a free end, and said plant support device comprising a ring for supporting plants, a fastener secured to said ring at a position along the circumference thereof for securing said ring to said support member in a substantially horizontal position, and a ring support structure for minimizing movement of said ring from said substantially horizontal position, said fastener having
   a first portion that abuts a major surface of said first flange, is integral with said ring at a position along the circumference thereof, and maintains said ring in said substantially horizontal position when abutting said major surface of said first flange, and
   a second portion integral with said first portion that releasably abuts said free edge of said second flange as to maintain said plant support device in a predetermined vertical position with respect to said support member, said ring support structure extending out from said position to positions along the circumference thereof at least 90 degrees from said position on said circumference.

19. The combination of claim 18 in which said second portion comprises a pair of arms terminating in a split cylindrical member having a threaded exterior surface, a threaded nut releasably threaded on said threaded exterior surface and abutting said free edge of said second flange.

* * * * *